(12) United States Patent
Seo

(10) Patent No.: US 6,341,797 B1
(45) Date of Patent: Jan. 29, 2002

(54) AIR BAG DEVICE FOR SIDE COLLISION OF AUTOMOBILE

(75) Inventor: Kasumi Seo, Kanagawa-ken (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/308,411

(22) PCT Filed: Sep. 18, 1998

(86) PCT No.: PCT/JP98/04228

§ 371 Date: Jul. 14, 1999

§ 102(e) Date: Jul. 14, 1999

(87) PCT Pub. No.: WO99/15370

PCT Pub. Date: Apr. 1, 1999

(30) Foreign Application Priority Data

Sep. 19, 1997 (JP) .............................................. 9-255660

(51) Int. Cl.[7] .............................................. B60R 21/22
(52) U.S. Cl. .................................. 280/730.2; 280/728.3
(58) Field of Search .......................... 280/728.2, 728.3, 280/730.1, 730.2, 743.1

(56) References Cited

U.S. PATENT DOCUMENTS

| 5,645,295 A | * | 7/1997 | White, Jr. et al. ........ 280/730.2 |
| 5,669,627 A | * | 9/1997 | Marjanski et al. ........ 280/728.2 |
| 5,676,393 A | * | 10/1997 | Rose ........................ 280/728.2 |
| 5,799,971 A | * | 9/1998 | Asada ...................... 280/730.2 |
| 5,899,485 A | * | 5/1999 | Folsom et al. ........... 280/728.2 |
| 5,906,395 A | * | 5/1999 | Isaji et al. ................ 280/728.2 |
| 6,045,151 A | * | 4/2000 | Wu .......................... 280/728.3 |

FOREIGN PATENT DOCUMENTS

| JP | 9-104307 | 4/1997 |
| JP | 9-136596 | 5/1997 |
| JP | 9-164894 | 6/1997 |

* cited by examiner

*Primary Examiner*—Kenneth R. Rice
*Assistant Examiner*—Lynda Jasmin
(74) *Attorney, Agent, or Firm*—McDermott, Will & Emery

(57) ABSTRACT

A housing (3) has a cylindrical side face portion (8) formed with an extrusion-molded product. Inside the housing (3) an air bag (1) and an inflator (4) are accommodated. The housing (3) is fixed to a portion of a seat back frame (20) of a seat positioned at a vehicle transverse outer side portion. A splitting-opening portion (12) structured with both end portions (13, 14) of the housing (3) engageable with each other is provided at a side face portion (8) of the housing (3).

6 Claims, 5 Drawing Sheets

AIR BAG DEVICE FOR SIDE COLLISION OF AUTOMOBILE

TECHNICAL FIELD

The present invention relates to an air bag apparatus for lateral collision of an automobile.

BACKGROUND ART

As an air bag apparatus for lateral collision of an automobile, there is one of a type where an air bag is developed forwards from an outer end portion, in a vehicle transverse direction, of a seat back to protect a vehicle occupant (refer to Japanese Patent Application Laid-Open No.9-136598 as a similar art).

An air bag apparatus of this type has a structure where an air bag and an inflator are accommodated in a metallic container opened at a front side thereof. The air bag breaks through the seat back to develop forwards by gas injected from the inflator.

However, such a prior art is disadvantageous regarding weight because a metallic container is used for accommodating an air bag. Also, when a vehicle occupant sits on a seat, the occupant feels a foreign matter at his/her back because the metallic container is hard. Furthermore, since the air bag may be injured by end edge of an opening portion of the metallic container, it is necessary to conduct a heming process on the end portion of the opening portion, which results in trouble work in manufacture of the metallic container.

The present invention has been achieved in view of such a prior art, and provides an air bag apparatus for lateral collision of an automobile which can be reduced in weight and does not give a feeling of foreign matter to the back of a vehicle occupant.

DISCLOSURE OF INVENTION

The aspect of the present invention is an air bag apparatus comprising a housing formed of a synthetic resin and fixed to an outer end portion, in a vehicle transverse direction, of a seat back, an air bag and an inflator accommodated in the housing, and a splitting-opening portion which is configured by end portions opposed to be engaged with each other when the air bag is accommodated in the housing. The air bag projects through the splitting-opening portion as the air bag is expanded and developed.

According to the above arrangement, as a housing formed of the synthetic resin is used instead of a metallic container, the weight of the air bag apparatus can be reduced. Also, as the housing is deformable when it is pressed, there is no fear that the air bag apparatus gives a feeling of foreign matter to the back of a vehicle occupant. Since the splitting-opening portion where the end portions are engaged with each other is provided in the housing, the air bag is developed from a predetermined portion (the splitting-opening portion) of the housing without fail, so that the developing behavior of the air bag is made stable.

The housing may be formed in one piece covering peripheries of the air bag and the inflator to accommodate the same, and the splitting-opening portion can be formed by engaging end portions of the housing of the one piece with each other.

According to the above arrangement, as the housing is one piece, it can easily be manufactured.

The splitting-opening portion may have a structure where a hook portion formed at one end of the housing and a recessed portion formed at the other end thereof are engaged with each other.

According to the above arrangement, since the splitting-opening portion is configured by the hook portion formed at the one end of the housing and the recessed portion at the other end, an engaging force of the splitting-opening portion can easily be adjusted by changing the shapes and sizes of the hook portion and the recessed portion. Accordingly, the engaging force of the splitting-opening portion can easily be set to be an optimal magnitude in which the splitting-opening portion is not opened easily and it is opened securely when the air bag is developed.

The splitting-opening portion may be provided at an outer side position, in the vehicle transverse direction, of the housing fixed to the seat back.

According to the above arrangement, as the splitting-opening portion is provided at the outer side position, in the vehicle transverse direction, of the housing, the splitting-opening portion is positioned along the longitudinal direction of a vehicle. Accordingly, the pressure acting on the splitting-opening portion from the back of the vehicle occupant due to a normal use of the seat back acts so as to engage the hook portion and the recessed portion with each other, so that the splitting-opening portion is prevented from being opened due to a normal use of the seat back.

The splitting-opening portion may be arranged at the rear side of the outer side position of the housing.

According to the above arrangement, the splitting-opening portion is arranged at the rear side of the outer side position, the vehicle occupant side face of the housing opened to extend forward by development of the air bag is elongated. Accordingly, the occupant side face of the housing which has extended forward services as a guide for developing the air bag forward, and also serves so as to prevent the vehicle occupant and the air bag expanding rapidly from directly contacting with each other.

BEST MODE FOR CARRYING OUT THE INVENTION

An embodiment of the present invention will be described with reference to the drawings below.

Figure 1:
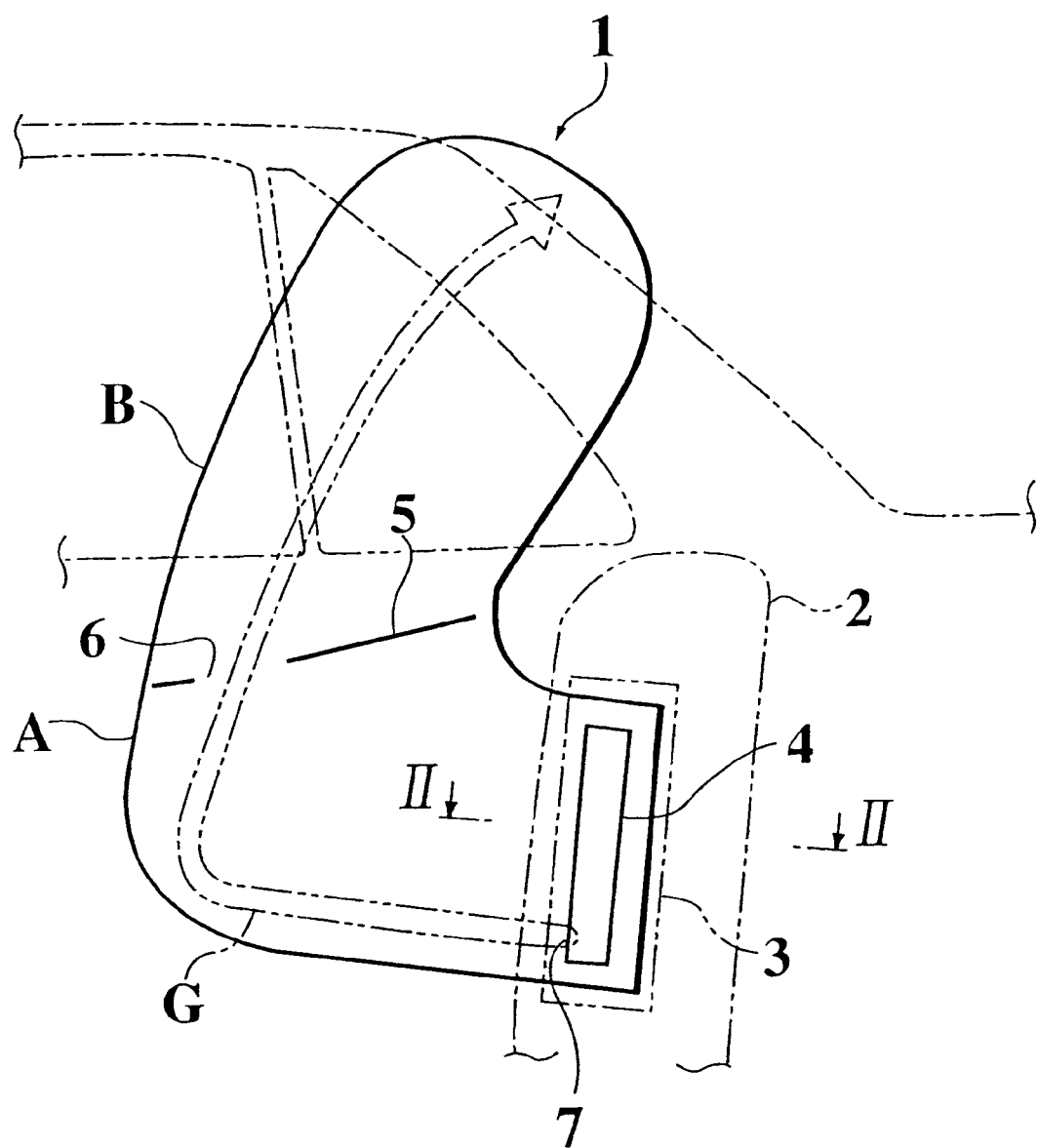
FIG. 1 is a side view showing an air bag apparatus for lateral collision according to an embodiment of the present invention.

First, a structure of an air bag 1 will be described on the basis of FIG. 1. A housing 3 is built in the right side end portion of a seat back 2 of a rear seat. The air bag 1 and an inflator 4 are accommodated in the housing 3.

The air bag 1 is formed in an almost L shape and is provided inside with a partition wall cloth partitioning an inside space of the air bag 1 into a breast protecting portion A at a lower side and a head protecting portion B at an upper portion. A vent hole 6 is formed at a front side of the partition wall cloth 5.

Injecting holes 7 are formed at a side face and lower portion of the inflator 4. Gas G injected from the injecting holes 7 first enters in the breast protecting portion A to develop the breast protecting portion A forward. Thereafter, the gas G in the breast protecting portion A flows into the head protecting portion B through the vent hole 6, so that the head protecting portion B is developed upwardly.

Next, the structure of the housing 3 and a mounting structure to the seat back 2 will be described on the basis of FIGS. 2 to 5.

Figure 2:
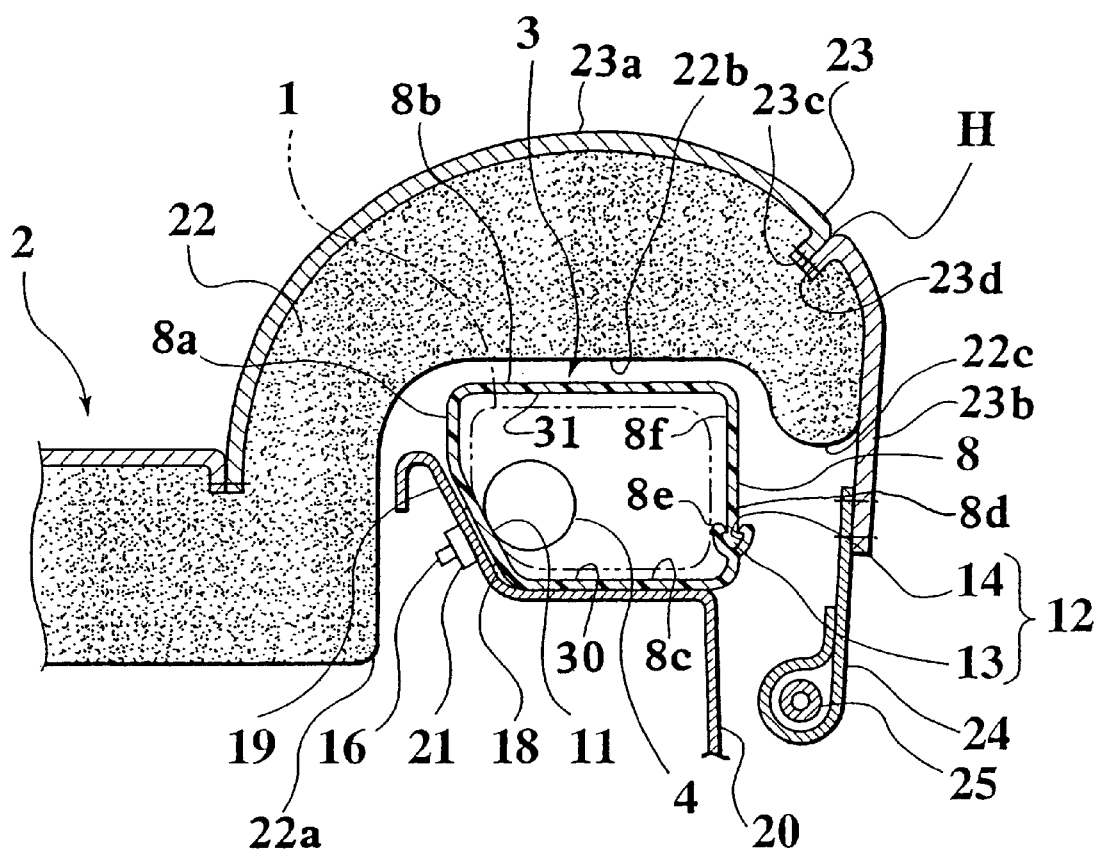
FIG. 2 is a sectional view showing a non-development state of an air bag taken along arrow II–II in FIG. 1.
Figure 4:
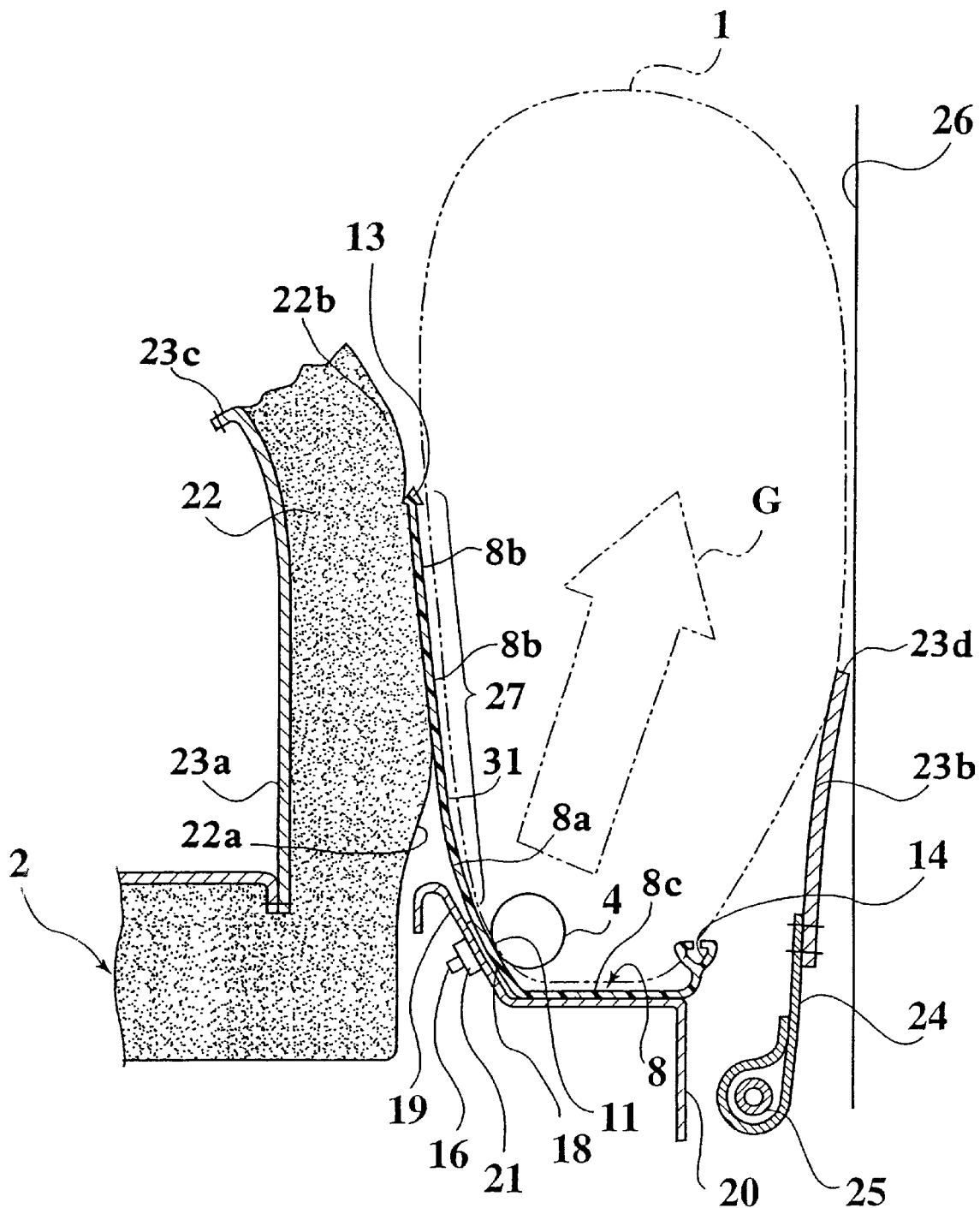
FIG. 4 is a sectional view showing a developed state of the air bag and which corresponds to FIG. 2.
Figure 5:
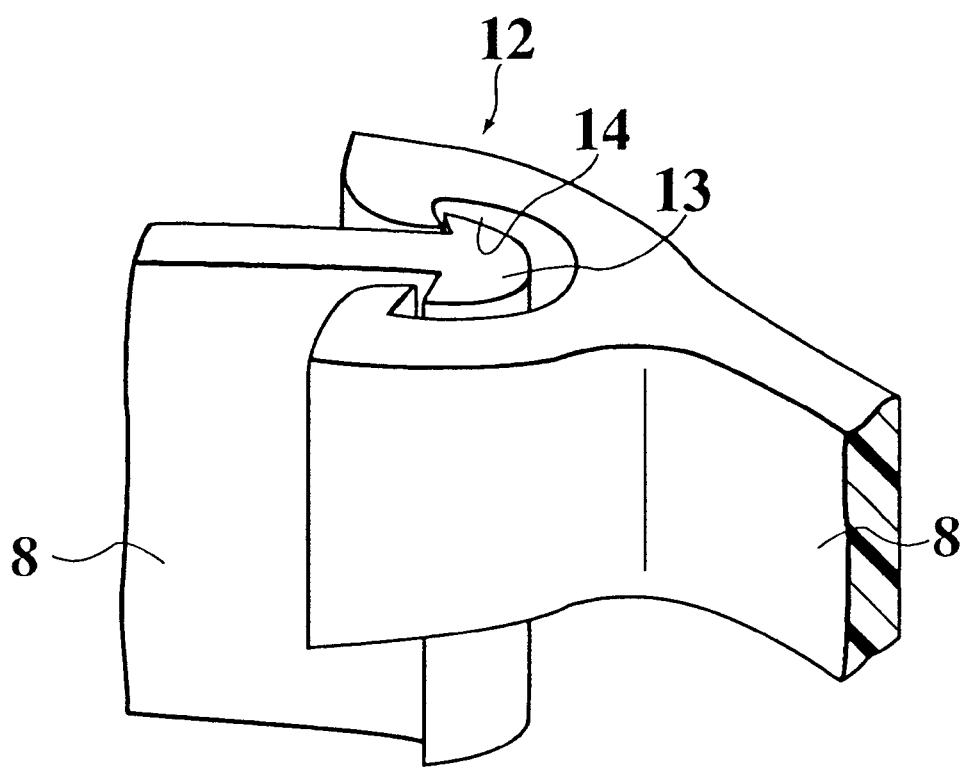
FIG. 5 is an enlarged view showing arrow DA portion in FIG. 3.

The housing 3 is configured with a tubular side face portion 8 extrusion molded with synthetic resin, and an upper cover 9 and a lower cover 10 made of synthetic resin. The side face portion 8 has an approximately rectangular cross-sectional configuration with an oblique side portion 11 formed partially thereof, and is provided at a vehicle transverse outer side and rear side portion with a splitting-opening portion 12. More specifically, as shown in FIG. 2, the side face portion 8 is five-sided in cross-section with: the oblique side portion 11 as a fixed side fixed to a later-described seat back frame 20; a left lateral side 8a extending frontward from a front end of the oblique fixed side 11; a front transverse side 8b transversely extending from a front end of the left lateral side 8a; a rear transverse side 8c transversely extending from a rear end of the oblique fixed side 11; and a right lateral side 8d interconnecting a right end of the front transverse side 8b and a right end of the rear transverse side 8c. The splitting-opening portion 12 is formed in a rear part 8e of the right lateral side 8d, not in a front part 8f thereof, so that, when the air bag 1 is inflated, the side face portion 8 is split as shown in FIG. 4 into a relatively short rear side portion 30 including the rear transverse side 8c and a relatively long front side portion 31 including the left lateral side 8a, the front transverse side 8b, and the front part 8f of the right lateral side 8d.

The splitting-opening portion 12 has a structure where a hook portion 13 with an arrowhead-shaped cross section formed at a distal end of the front side portion 31 of the side face portion 8 and a groove 14 with an arrowhead-shaped cross section formed as a recessed portion at a distal end of the rear side portion 30 of the side face portion 8 are engaged with each other. A engaging force in the splitting-opening portion 12 can easily be adjusted in accordance with the shapes and sizes of the hook portion 13 and the groove portion 14. In this embodiment, the engaging force is set to be a optimal one where the splitting-opening portion 12 is not opened easily against the pressure acting from the back of the vehicle occupant during a normal use of the seat back 2 and it is securely opened when the air bag I is developed.

Since the splitting-opening portion 12 thus structured is formed at a vehicle transverse outer side position of the side face portion 8, it is positioned along a vertical direction of the vehicle. Therefore, the pressure from the back of the vehicle occupant during a normal use of the seat back 2 acts on the hook portion 13 and the groove portion 14 in a direction in which the both are engaged with each other. Accordingly, the splitting-opening portion 12 is prevented from being opened when the seat back 2 is ordinarily used.

Figure 3:
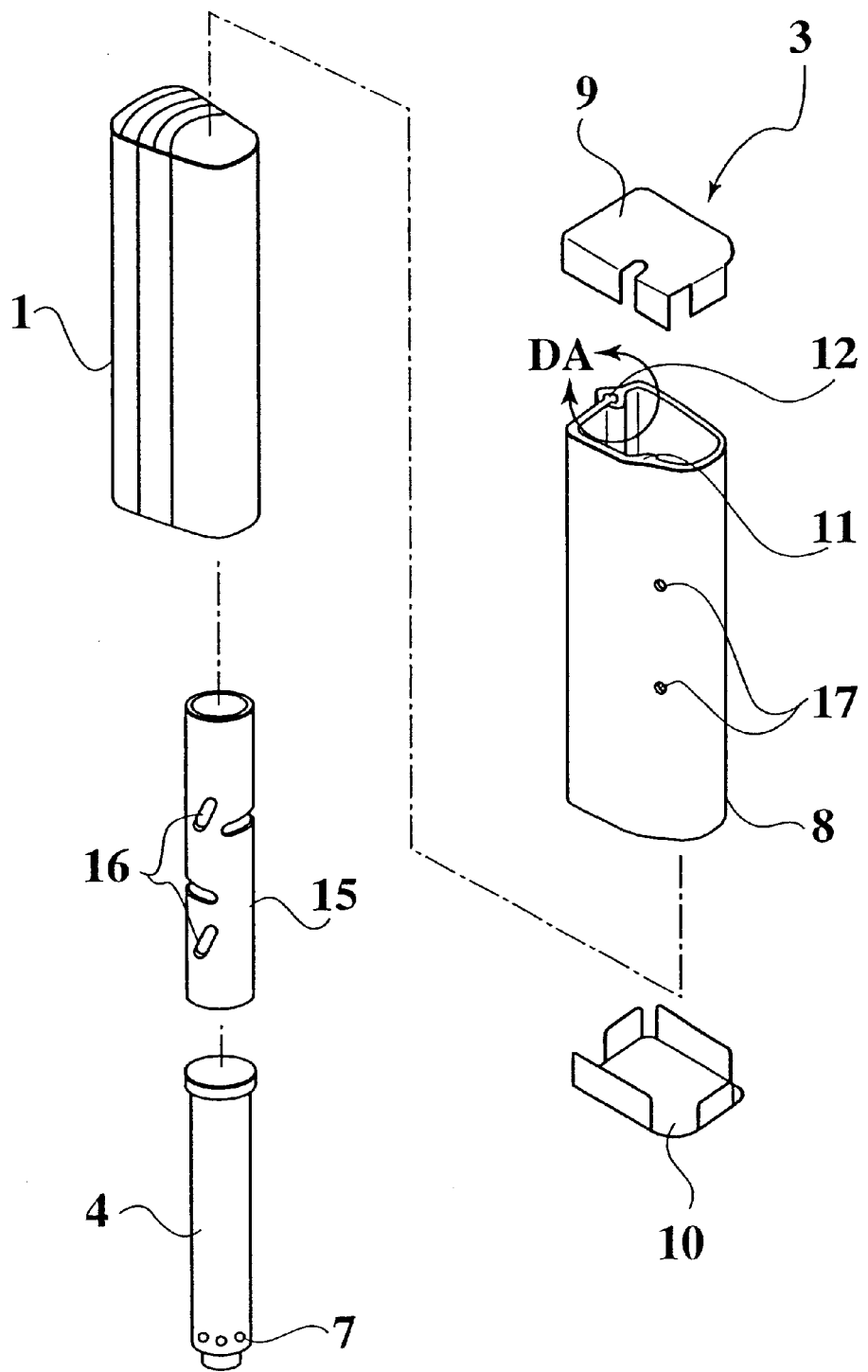
FIG. 3 is an exploded perspective view showing an inside structure of a housing.

As shown in FIG. 3, the inflator 4 is accommodated within the housing 3 in a state where it is inserted in a protecting pipe 15. A pair of upper and lower bolts 16 formed on the protecting pipe 15 projects outside from passing-through holes 17 of the oblique face portion 11. The projecting bolt 16 is provided with a temporarily retaining ring 18 (refer to FIG. 2). The housing 3 where the air bag 1 and the inflator 4 are accommodated is handled as one module.

A seat back frame 20 with an oblique face portion 19 corresponding to the oblique face portion 11 is disposed at the right side end portion of the seat back 2. The bolts 16 are made to pass through the oblique face portion 19 to be fixed to the seat back frame 20 by a nut 21, so that the mount of the housing is completed.

A front pad 22 mounted at the front side of the seat back frame 20 and an outer skin cover 23 covering the outside of the pad 22 are disposed forward of the housing 3 so as to surround the housing 3. As shown in FIG. 2, the outer end portion of the seat back 2 is forwardly rounded, where the front pad 22 is forwardly recessed to receive the seat back frame 20 with the housing 3 mounted thereon. The pad 22 thus has a left lateral portion 22a facing a left side of the housing 3, a front transverse portion 22b facing a front side of the housing 3, and a relatively small right lateral portion 22c rearwardly projecting from a transversely outer end of the front transverse portion 22b and facing merely the front part 8f of the right lateral side 8d of the side face portion 8 of the housing 3. The outer skin cover 23 is formed by a number of skin pieces including a front piece 23a covering a front outside of the front portion 22b of the pad 22 and a lateral piece 23b covering a lateral outside of the right portion 22c of the pad 22, by sewing their edges to be joined together. A sewn portion H between a right edge 23c of the front piece 23a and a front edge 23d of the lateral piece 23b is positioned at an outermost side, in the vehicle transverse direction, of the outer skin cover 23, and constitutes an splitting-opening portion in the outer skin cover 23, and is sewn with a thread weaker than that in the other sewn portion. Furthermore, the outer skin cover 23 at the vehicle transverse outermost side is connected to a pipe frame 25 through a reinforcing cloth 24. Accordingly, the outer skin cover 23 is securely opened and split at the sewn portion H.

When gas G injected from the inflator 4 at a time of side collision of the vehicle, the air bag 1 is expanded in the housing 3 and the engagement of the splitting-opening portion 12 is disengaged, so that the housing 3 is put in an opened state. Since the splitting-opening portion 12 has a structure where the hook portion 13 and the groove portion 14 are engaged with each other, the air bag 1 is necessarily developed from the splitting-opening portion 12. Accordingly, the developing behavior of the air bag 1 is made stable.

The air bag 1 pressing and opening the splitting-opening portion 12 to develop forward further presses and breaks the pad 22 and the sewn portion H of the outer skin cover 23 to develop forward. Since the housing 3 itself is made of synthetic resin, it is relatively soft. However, as the housing 3 is disposed at a transversely outer side of the seat back 2 near to a vehicle body side wall 26, a transversely outer side portion of the air bag 1 is guided by the vehicle body side wall 26 and a vehicle occupant side portion of the air bag 1 is guided by an inside 27 (refer to FIG. 4) of the front side portion 31 of the side face portion 8 of the housing 3 which has been opened and split to extend forward. Accordingly, even when the housing 3 is relatively soft, the air bag can be led sufficiently forward.

Particularly, since the splitting-opening portion 12 is provided at the vehicle transverse outer side and rear side position in the side face portion 8, the front side portion 31 of the housing opened to extend forward by development of the air bag 1 is elongated, so that the air bag 1 developed forward is guided forward by the front side portion 31. Also, the air bag 1 expanded rapidly and the vehicle occupant are prevented from directly contacting with each other by the front side portion 31. Furthermore, the front side portion 31 is long, so that it has a strong force to extend toward the sewn portion H, pressing to break the pad 22 and the outer skin cover 23.

According to this embodiment, as the synthetic resin cover extrusion molded is used as the housing 3, weight can be reduced as compared with a conventional metallic container. Also, since the synthetic resin cover is easily deformed or flexed when it is pressed, there is no fear that a feeling of foreign matter is given to the back of the vehicle occupant. Furthermore, as the synthetic resin cover can be formed by an extrusion molding, it can easily be manufactured.

INDUSTRIAL APPLICABILITY OF THE INVENTION

As mentioned above, according to the present invention, as the housing formed of synthetic resin is used, the weight of the air bag apparatus for lateral collision is reduced. Also, the housing can easily be deformed, there is no fear that it gives a feeling of foreign matter to the back of a vehicle occupant. The splitting-opening portion structured with the end portions engaged with each other is provided in the housing, the air bag is developed necessarily at a predetermined position (the splitting-opening portion), the developing behavior of the air bag is made stable.

Accordingly, the present invention is useful for an air bag apparatus for lateral collision of an automobile.

What is claimed is:

1. An air bag system including an air bag to be deployed upon a lateral collision of an automobile, comprising:
    a seatback of a seat in an automobile, the seatback having, in a transverse direction of the automobile, an outer end portion thereof comprising:
    a seatback frame;
    a front pad in front of the seatback frame, the front pad having a front transverse portion and a lateral portion rearwardly projecting from a transversely outer end of the front transverse portion; and
    an outer cover covering an outside of the front pad, the outer cover having a sewn portion at a front end of a lateral portion thereof covering the lateral portion of the front pad;
    an air bag having a breast protecting portion and a head protecting portion connected to each other to be sequentially deployed;
    an inflator for inflating the air bag; and
    a resin-make tubular housing member installed between the seatback frame and the front pad for accommodating therein a combination of the air bag and the inflator, the tubular housing member having in the transverse direction of the automobile an outer lateral side interconnecting outer ends of front and rear transverse sides thereof, the tubular housing member comprising:
    a fixed portion fixed to the seatback frame;
    a front side portion including the front transverse side and a front part of the outer lateral side facing the lateral portion of the front pad;
    a rear side portion including the rear transverse side; and
    a splitting-opening portion formed in a rear part of the outer lateral side, the splitting-opening portion comprising mating end portions of the front side portion and the rear side portion of the tubular housing member configured, when the combination of the air bag and the inflator is accommodated in the tubular housing member, to engage with each other in an opposing manner and when the air bag is inflated, to separate from each other so that the tubular housing member opens and the front side portion thereof extends toward the sewn portion of the outer cover, breaking the front pad, and guides the air bag to deploy along the extending front side portion and through the sewn portion of the outer cover.

2. An air bag system according to claim 1, wherein the tubular housing member comprises a single extruded mold for enclosing the combination of the air bag and the inflator.

3. An air bag system according to claim 1, wherein the mating end portions of the front side portion and the rear side portion of the tubular housing member are formed with a hook portion and a recessed portion engageable with each other when the combination of the air bag and the inflator is accommodated in the tubular housing member and disengageable from each other when the air bag is inflated.

4. An air bag system according to claim 1, wherein the splitting-opening portion is formed along a longitudinal direction of the tubular housing member.

5. An air bag system according to claim 1, wherein the fixed portion of the tubular housing member is fixed to the seat back by the inflator.

6. An air bag deployment system for deploying an air bag along a side wall of a vehicle body of an automobile, from a seatback portion near the side wall, upon a lateral collision of the automobile, comprising:
    a seatback portion comprising:
        a frame;
        a pad mounted on a front side of the frame, the pad being integrally formed with a front portion extending toward a side wall of a vehicle body, and a lateral portion disposed near the side wall; and
        a cover put on the pad, the cover including front and lateral portions on the front and lateral portions of the pad, respectively, with a sewn portion therebetween;
    a set of an air bag and an inflator therefor; and
    a resin-make tubular housing member installed between the frame and the pad for accommodating therein the set of the air bag and the inflator, the tubular housing member comprising:
        a fixed portion fixed to the frame;
        a front side portion extending from one end of the fixed portion and facing the front and lateral portions of the pad;
        a rear side portion extending from another end of the fixed portion and facing the frame; and
        a splitting-opening portion comprising mating end portions of the front and rear side portions configured, when the combination of the air bag and the inflator is accommodated in the tubular housing member, to engage with each other, and when the air bag is inflated, to split from each other so that the tubular housing member opens and the front side portion thereof extends toward the sewn portion of the cover, breaking the pad, and guides the air bag to deploy along the extending front side portion, through the sewn portion of the cover, and along the side wall.

* * * * *